United States Patent
Vigeant et al.

(10) Patent No.: US 7,793,978 B2
(45) Date of Patent: Sep. 14, 2010

(54) CONSTRAINED AIRBAG DEPLOYMENT USING AN EXTERNAL TETHER

(75) Inventors: Peter L. Vigeant, Troy, MI (US); Stephanie Schneider, Ferndale, MI (US); David L. Geyer, Sterling Heights, MI (US); Robert A. Parks, Berkley, MI (US); Minoru Niwa, West Bloomfield, MI (US)

(73) Assignee: Toyoda Gosei Co. Ltd. (JP)

( * ) Notice: Subject to any disclaimer, the term of this patent is extended or adjusted under 35 U.S.C. 154(b) by 88 days.

(21) Appl. No.: 12/021,473

(22) Filed: Jan. 29, 2008

(65) Prior Publication Data

US 2009/0189376 A1 Jul. 30, 2009

(51) Int. Cl.
 *B60R 21/16* (2006.01)
 *B60R 21/205* (2006.01)
(52) U.S. Cl. .................. 280/743.2; 280/732; 280/739; 280/742; 280/743.1
(58) Field of Classification Search .......... 280/732, 280/739, 742, 743.1, 743.2
See application file for complete search history.

(56) References Cited

U.S. PATENT DOCUMENTS

| | | | | |
|---|---|---|---|---|
| 5,246,250 | A * | 9/1993 | Wolanin et al. | 280/739 |
| 5,280,953 | A * | 1/1994 | Wolanin et al. | 280/739 |
| 5,405,166 | A * | 4/1995 | Rogerson | 280/739 |
| 6,736,426 | B2 * | 5/2004 | Winters et al. | 280/743.2 |
| 6,883,831 | B2 * | 4/2005 | Hawthorn et al. | 280/739 |
| 7,261,319 | B2 * | 8/2007 | DePottey et al. | 280/739 |
| 7,441,805 | B2 * | 10/2008 | Jamison et al. | 280/743.2 |
| 7,497,469 | B2 * | 3/2009 | Fischer et al. | 280/743.2 |
| 2005/0098990 | A1 * | 5/2005 | Pinsenschaum et al. | 280/739 |
| 2005/0098994 | A1 * | 5/2005 | Matsumura | 280/743.1 |
| 2006/0151979 | A1 * | 7/2006 | DePottey et al. | 280/739 |
| 2006/0186655 | A1 * | 8/2006 | Ehrke | 280/743.1 |
| 2006/0214406 | A1 * | 9/2006 | Parkinson et al. | 280/743.2 |
| 2006/0232054 | A1 * | 10/2006 | Schlosser et al. | 280/743.2 |
| 2007/0007757 | A1 * | 1/2007 | Bauer et al. | 280/743.2 |
| 2007/0024033 | A1 * | 2/2007 | Suzuki et al. | 280/730.2 |
| 2007/0108753 | A1 * | 5/2007 | Pang et al. | 280/743.2 |
| 2007/0170703 | A1 * | 7/2007 | Miyata | 280/730.1 |
| 2007/0182144 | A1 * | 8/2007 | Aranzulla et al. | 280/743.2 |
| 2007/0210568 | A1 * | 9/2007 | Thomas et al. | 280/743.2 |
| 2009/0102174 | A1 * | 4/2009 | Kim | 280/743.2 |
| 2009/0189377 | A1 * | 7/2009 | Vigeant et al. | 280/743.2 |
| 2009/0189378 | A1 * | 7/2009 | Vigeant et al. | 280/743.2 |

FOREIGN PATENT DOCUMENTS

JP 07069149 3/1995

* cited by examiner

*Primary Examiner*—Paul N. Dickson
*Assistant Examiner*—Barry Gooden, Jr.
(74) *Attorney, Agent, or Firm*—Carlson, Gaskey & Olds PC

(57) ABSTRACT

An example airbag arrangement includes an airbag that moves between an expansion-constrained position and an expanded position. A tether adjacent an exterior surface of the airbag moves with the airbag between a shorter position and a longer position. The tether remains intact in the shorter position and the longer position. When the tether is in the shorter position, the tether holds the airbag in the expansion-constrained position.

23 Claims, 4 Drawing Sheets

CONSTRAINED AIRBAG DEPLOYMENT USING AN EXTERNAL TETHER

BACKGROUND OF THE INVENTION

This invention relates to externally tethering an airbag to constrain the airbag during deployment.

Known airbag systems protect vehicle occupants by absorbing forces generated during collisions, for example. Many airbag systems are used in conjunction with other vehicle safety systems, such as seat belts. Safety systems protect occupants located in various positions within the vehicle.

In particular, airbag designs within some safety systems protect both "in-position" occupants and "out-of-position" occupants. Typically, during a collision, an "in-position" occupant directly strikes a contact face portion of the airbag, whereas an "out-of-position" occupant does not directly strike the contact face. Balancing protection of "in-position" occupants with protection of "out-of-position" occupants is often challenging. Through the contact face, the airbag absorbs forces from the occupant that are generated during the collision. Directly striking the contact face facilitates force absorption.

Some airbags control the deployment of the airbag using internal tethers within the airbag. Other airbag systems incorporate breakable tethers wrapped around a partially deployed airbag. Deploying the airbag breaks the tethers. Tuning airbag deployment characteristics is difficult using both internal tethers and breakable tethers.

SUMMARY OF THE INVENTION

An example airbag arrangement includes an airbag that moves between an expansion-constrained position and an expanded position. A tether adjacent an exterior surface of the airbag moves with the airbag between a shorter position and a longer position. The tether remains intact in the shorter position and the longer position. When the tether is in the shorter position, the tether holds the airbag in the expansion-constrained position.

The example airbag arrangement may include an airbag that moves between an expansion-constrained position and an expanded position. A tether constrains expansion of the airbag. The tether surrounds a portion of the airbag and has a first length and a second length. The second length is longer than the first length.

An example method of constraining an airbag includes expanding an airbag against a tether, increasing the tether length, and expanding the airbag further.

BRIEF DESCRIPTION OF THE DRAWINGS

The various features and advantages of this invention will become apparent to those skilled in the art from the following detailed description of an embodiment of the invention. The drawings that accompany the detailed description can be briefly described as follows.

DETAILED DESCRIPTION OF AN EXAMPLE EMBODIMENT

Figure 1:
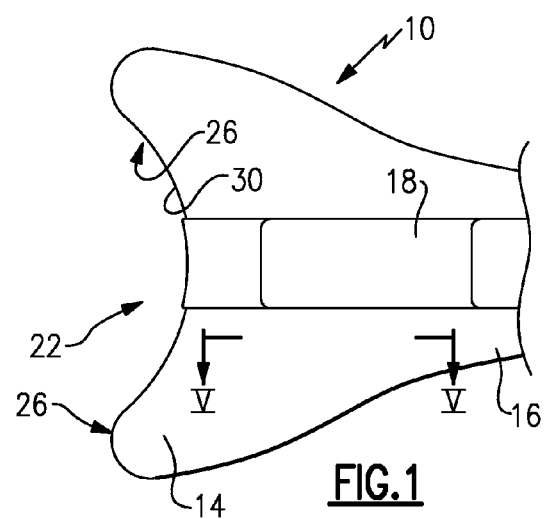
FIG. 1 shows a top view of an example airbag assembly in an expansion-constrained position.
Figure 1A:
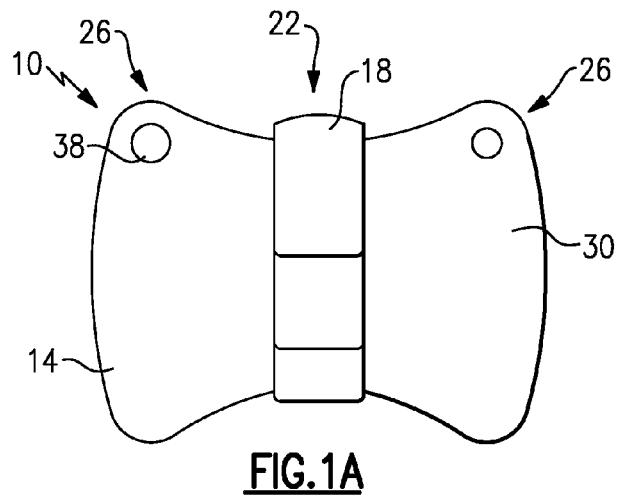
FIG. 1A shows a front view of the FIG. 1 airbag assembly.

FIGS. 1 and 1A illustrate an example airbag assembly 10 in an expansion-constrained position. A tether 18 adjacent an airbag 14 limits expansion and movement of a central contact area 22 of the airbag 14. The airbag 14 expands in a known manner, and contacts the tether 18 when expanding.

The central contact area 22 is located between two outer contact areas 26, which expand past the tether 18 and the central contact area 22 closer to an occupant. The outer contact areas 26 and the central contact area 22 combine to form a contact face 30 for contacting the vehicular occupant. As known, it is desirable to contact the occupant with the central contact area 22 of the contact face 30 when the airbag 14 is in an expanded position. It is also desirable for the contact face 30 to maintain a generally vertical profile with contacting the occupant 32.

Figure 2:
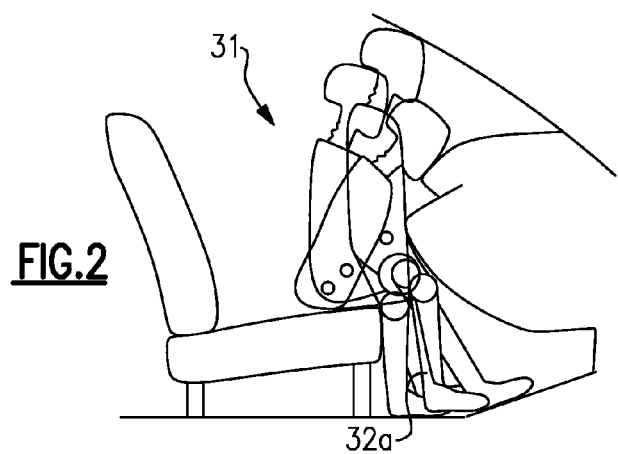
FIG. 2 shows various side views of example "out-of position" occupant within a vehicle.

In this example, the occupant 32*a* is an out-of-position occupant. FIG. 2 illustrates other positions within a vehicle 31, which would correspond to classifying the occupant as the out-of-position occupant 32*a*. Constraining expansion of the central contact area 22 more than the outer contact areas 26 causes the contact face 30 to have a generally concave profile during expansion, as shown in FIG. 1 top view. Such a profile tends to direct the out-of-position occupant 32*a* toward the central contact area 22 from the outer contact areas 26. The occupant 32*a* would benefit from such movement toward the central contact area 22.

Figure 3:
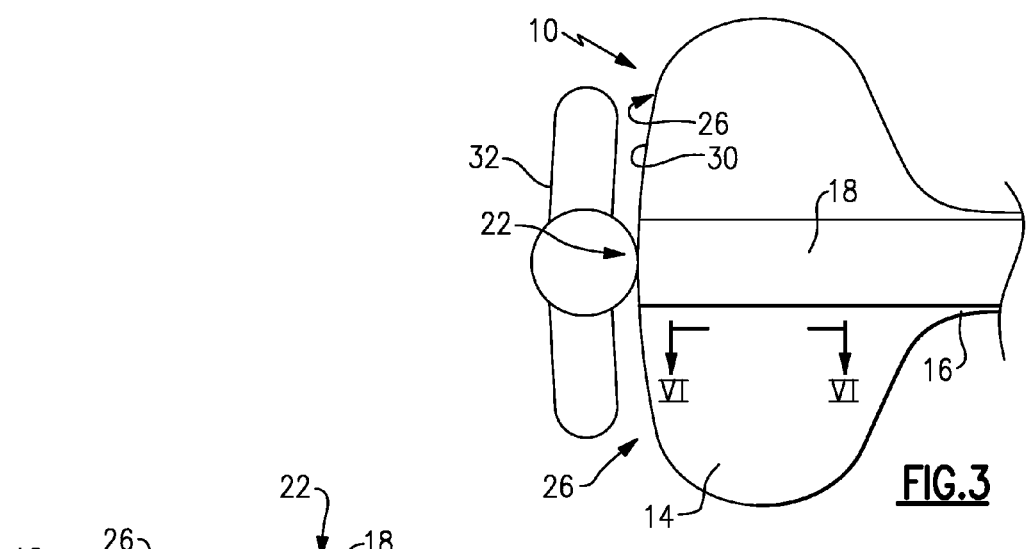
FIG. 3 shows a top view of the FIG. 1 airbag assembly in an expanded position.
Figure 3A:
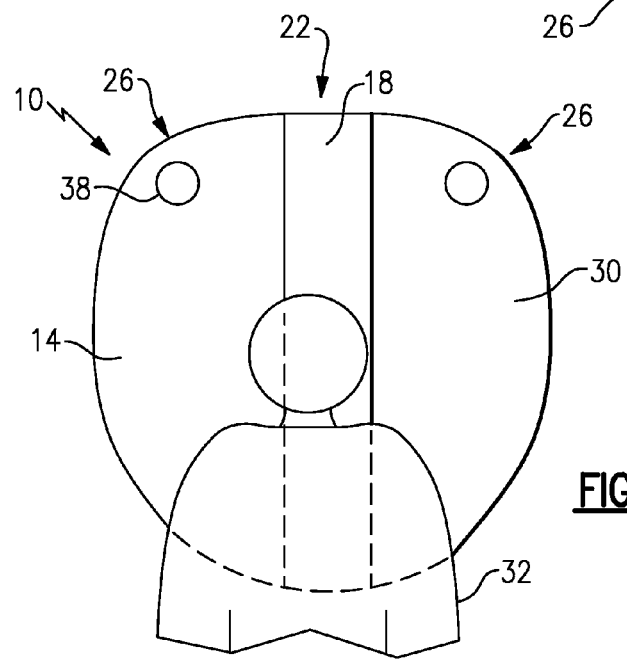
FIG. 3A shows a front view of the FIG. 1 airbag assembly in an expanded position.
Figure 4:
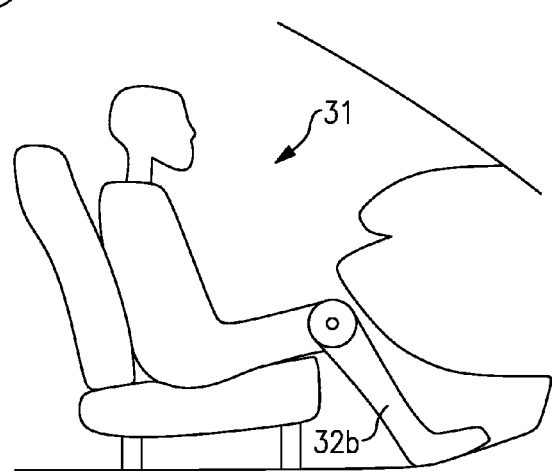
FIG. 4 shows a side view of an example "in-position" occupant within a vehicle.

Referring now to FIGS. 3 and 3A, the airbag 10 moves from the expansion-constrained position to a fully expanded position as shown. In the expanded position, the concavity of the contact face 30 is reduced as the central contact area 22 is no longer substantially constrained by the tether 18. In this example, the airbag 14 is optimized for absorbing forces from the occupant 32 when the airbag 14 is fully expanded and the occupant 32 is near the central contact area 22. Moving the occupant 32 toward the central contact area 22 facilitates force absorption as the occupant 32 directly contacts the central contact area 22. The fully expanded airbag 30 facilitates absorbing forces from an "in-position" occupant 32, such as the "in-position" occupant 32*b* of FIG. 4 shown within the vehicle 31.

The length of the tether 18 increases to permit the central contact area 22 to move from the expansion-constrained position to the expanded position. Forces exerted on the tether 18 increase the length of the tether 18 while both ends of the tether are anchored adjacent a base portion 16 of the airbag 14. In this example, expanding the airbag 14 exerts forces that expand folds 34 in the tether 18 to increase the tether 18 length.

Figure 5:
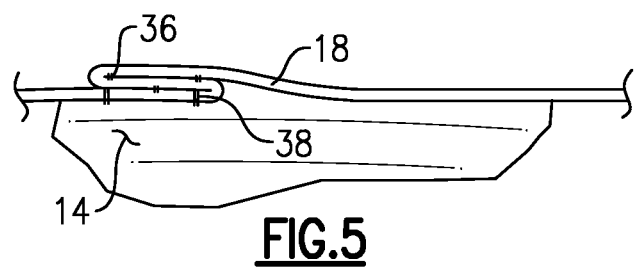
FIG. 5 shows a sectional side view along line V-V of FIG. 1.
Figure 6:
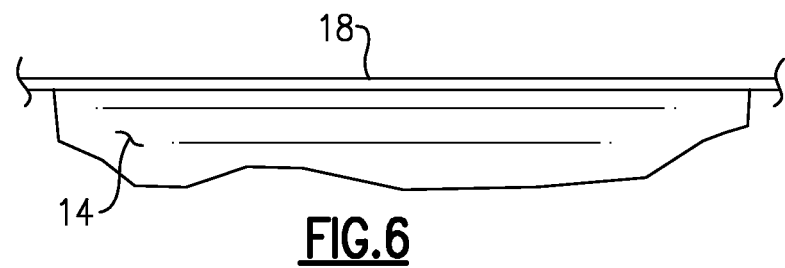
FIG. 6 shows a sectional side view along line VI-VI of FIG. 3.

Stitches 36 hold the initial position of the folds 34 and limit expansion of the central contact area 22, as shown in FIGS. 5 and 6. Stitches 38 also secure the tether 18 to the airbag 14. Exerting force on the tether 18 tears the stitches 36 permitting the tether 18 to unfold and increase in length. Tearing the stitches 36 requires more force than expanding the outer contact areas 26 facilitating formation of the expansion-constrained position. The tether 18 remains intact even as the stitches 36 tear.

Figure 7:
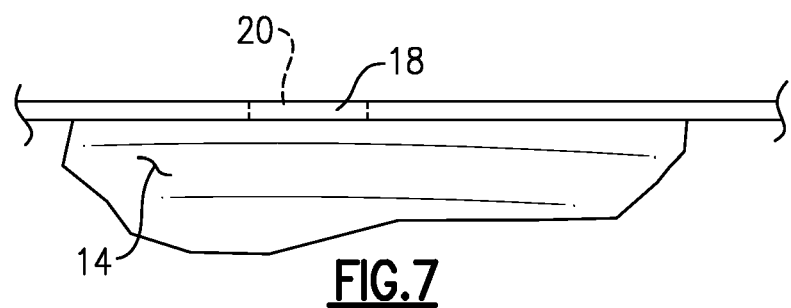
FIG. 7 shows a sectional side view of another example tether in an intact position.
Figure 8:
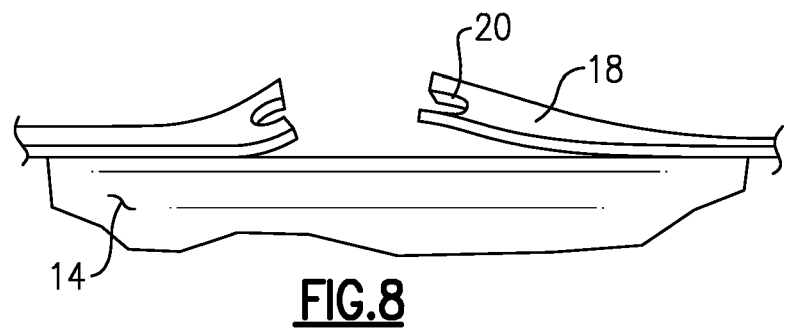
FIG. 8 shows a sectional side view of the FIG. 5A tether in a broken position.

Although described as increasing the length of the tether 18 by tearing stitches 36, those skilled in the art and having the benefit of this disclosure would understand that other features can be used to hold the tether 18 at a shorter length, and then increase the tether 18 length under force. For example, the tether 18 may include a polymer portion that deforms under load to increase the overall length of the tether 18. In other examples, it may be desirable to break a portion of the tether 18 such as shown in FIGS. 7 and 8. In such examples, the tether 18 includes an aperture 20, which tends to cause the tether 18 to break in an area near the aperture 20.

Figure 9:
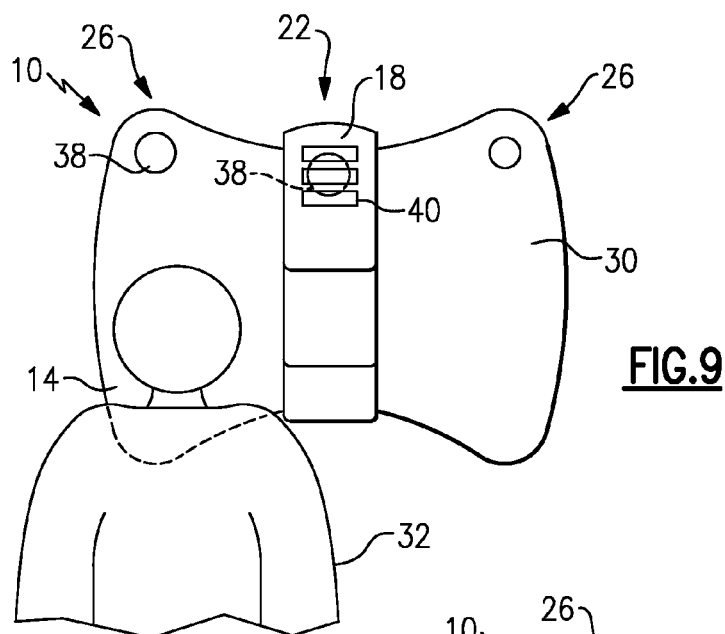
FIG. 9 shows a front view of another example airbag assembly having an active vent.
Figure 10:
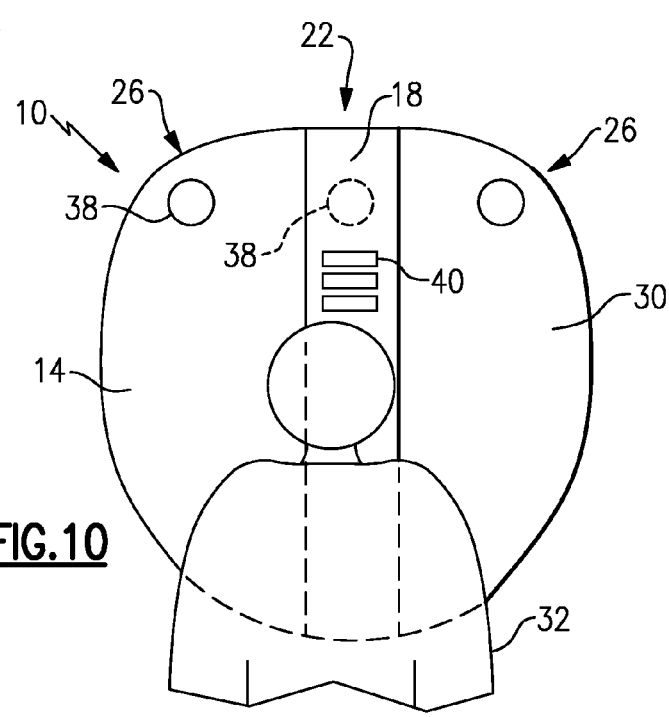
FIG. 10 shows a front view of the FIG. 9 airbag assembly in an expanded position.

The tether 18 may facilitate control of the airbag 14 expansion utilizing still other features. For example, portions of the tether 18 may cover an airbag vent 38, as shown in FIGS. 9 and 10. In the expanded position of FIG. 10, the tether 18 tightly covers the vent 38 limiting escaping air from the inside of the airbag 14. The tether 18 does not tightly cover the vent 38 until the airbag 14 moves to the expanded position, and possibly during the expansion-constrained position. When loosely covered between these positions, the vent 38 allows air to escape, which softens the airbag 30 helps provide a planar surface during the initial deployment stage, for example. The initial deployment stage generally correspond to the first 20 milliseconds of deployment. The shape of the airbag 14 is important during this stage. The vent 38 can be used to tune the expansion of the airbag 14. For example, substantially sealing the vent 38 with the tether 18 provides another level of control over the airbag 14 expansion.

The tether 18 may include one or more apertures 40 that interact with the vent 38. The apertures 40 move over the vent 38 as length of the tether 18 increases. Air from inside the airbag 30 escapes through the vent 38 through the apertures 40 when the apertures 40 move over the vent 38. Areas of the tether 18 without the apertures 40 restrict flow from the airbag 30 through the vent 38. Accordingly, the position of the apertures 40 relative the vent 38 controls the timing of opening and closing the vent 38. In one example, areas of the tether 18 with the apertures 40 permit flow during the first 20 milliseconds as the airbag 30 deploys, after which more of the tether 18 moves over the vent 38 to restrict more flow from the airbag 30.

Figure 11:
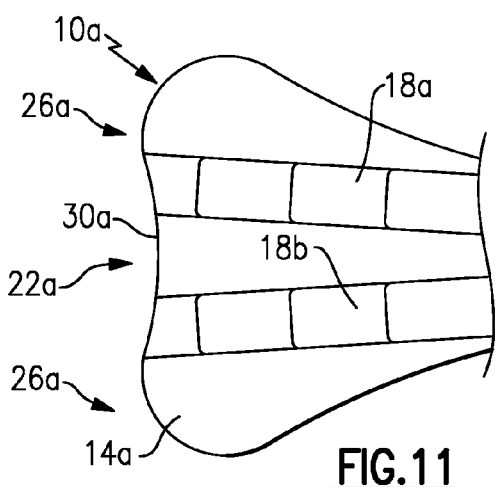
FIG. 11 shows another example airbag assembly.

Referring now to FIG. 11, other example airbag assemblies 10a include more than one tether 18a for constraining areas of the airbag 14a during expansion. In this example, using multiple tethers 18a increases the expansion-constrained portion of the central contact face 22a.

Other examples include altering the width of the single tether 18 to increase or decrease the expansion-constrained portion of the contract contact face 22. Often larger expansion-constrained portions are desired in larger vehicles and smaller expansion-constrained portions are desired in smaller vehicles. Further, different sized expansion-constrained portions are often desired to accommodate different sized occupants 32, particularly different occupant head sizes.

Figure 12:
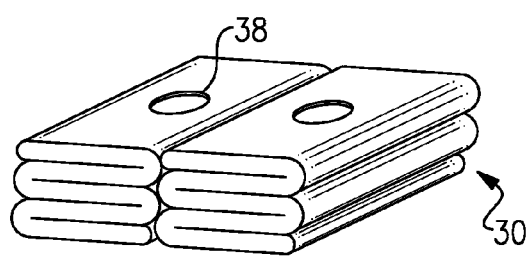
FIG. 12 shows the airbag of FIGS. 1-4 in a folded position.

Referring now to FIG. 12, the location of the vents 38 may further affect the expansion characteristics of the airbag 30. In this example, the airbag 30 expands from a 50/50 folded position having the upper half of the airbag 30 within upper folds and the lower half of the airbag 30 within lower folds. The 50/50 fold exposes some of the vents 39 on the top of the folded airbag 14.

Although a preferred embodiment of this invention has been disclosed, a worker of ordinary skill in this art would recognize that certain modification would come within the scope of this invention. For that reason, the following claims should be studied to determine the true scope and content of this invention.

We claim:

1. An airbag arrangement, comprising:
    an airbag moveable between a expansion-constrained position and an expanded position, wherein a contact face of said airbag has a concave exterior profile when said airbag is in said expansion-constrained position; and
    a tether adjacent and contacting an exterior surface of said airbag and moveable between a shorter intact position and a longer intact position, wherein said tether in said shorter intact position holds said airbag in said expansion-constrained position.

2. The airbag arrangement of claim 1, wherein said airbag moves said tether between said shorter intact position and said longer intact position.

3. The airbag arrangement of claim 1, wherein expanding said airbag does not break said tether.

4. The airbag arrangement of claim 1, wherein said airbag includes an airbag contact face having a central contact area positioned between outer contact areas, said tether being located adjacent said central contact area.

5. The airbag arrangement of claim 4, wherein said tether limits expansion of said central contact area and said outer contact areas expand past said tether when said airbag is in said expansion-constrained position.

6. The airbag arrangement of claim 1, wherein stitching holds said tether in said shorter position, and expanding said airbag breaks said stitching permitting movement of said tether to said longer position.

7. The airbag arrangement of claim 1, wherein portions of said airbag include a vent for controlling movement of said airbag toward said expanded position.

8. The airbag arrangement of claim 7, wherein said tether at least partially covers said vent.

9. The airbag arrangement of claim 1, wherein said tether encircles a portion of said airbag.

10. The airbag arrangement of claim 1, including a second tether also having a longer intact position and a shorter intact position, wherein said second tether also holds said airbag in said expansion-constrained position.

11. The airbag arrangement of claim 1, wherein said tether in said shorter intact position has a shorter effective length than said tether in said longer intact position.

12. The airbag arrangement of claim 1, wherein said tether in said shorter intact position is extended a first amount and said tether in said longer intact position is extended a second amount that is greater than the first amount.

13. The airbag arrangement of claim 1, wherein said tether covers a portion of an upper half of the airbag and the lower half of the airbag.

14. An airbag arrangement, comprising:
    an airbag moveable between a expansion-constrained position and an expanded position, the airbag having an airbag interior; and a tether for constraining expansion of said airbag, said tether surrounding a portion of said airbag to maintain a generally vertical airbag contact face when the airbag is in both the expansion-constrained position and the expanded position, said tether surrounding said portion of said airbag to maintain a concave exterior profile of said contact face when said airbag is in said expansion-constrained position, said tether being located outside the airbag interior.

15. The airbag arrangement of claim 14, wherein said tether is adjacent an exterior surface of said airbag and moveable between a shorter intact position and a longer intact position, wherein said tether in said shorter intact position holds said airbag in said expansion-constrained position.

16. The airbag arrangement of claim 14, wherein said tether is adjacent an exterior surface of said airbag and moveable between a intact position and a broken position, wherein said tether in said intact position holds said airbag in said expansion-constrained position.

17. The airbag arrangement of claim 14, wherein said tether in said shorter intact position has a shorter effective length than said tether in said longer intact position.

18. A method of constraining an airbag comprising:
(a) expanding a contact face of an airbag against a tether, an outer surface of the airbag contacting the tether during expanding;
(b) expanding outer contact areas of the airbag past the tether toward an occupant, such that the contact face has a concave exterior profile, the tether positioned between the expanded outer contact areas;
(c) increasing the tether length after said step (b); and
(d) expanding the airbag further after said step (b).

19. The method of claim 18, including the step of encircling the airbag with the tether.

20. The method of claim 18, wherein expanding the airbag increases the tether length.

21. The method of claim 18, including the step of anchoring the tether adjacent a base of the airbag.

22. The method of claim 18, wherein said tether mounts against an exterior surface of the airbag.

23. The method of claim 18, wherein a contact face of the airbag has a concave profile.

* * * * *